United States Patent
Nishida

(10) Patent No.: US 11,988,183 B2
(45) Date of Patent: May 21, 2024

(54) INTERNAL COMBUSTION ENGINE AND STRADDLED VEHICLE

(71) Applicant: YAMAHA HATSUDOKI KABUSHIKI KAISHA, Iwata (JP)

(72) Inventor: Kenji Nishida, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 18/335,634

(22) Filed: Jun. 15, 2023

(65) Prior Publication Data
US 2024/0018930 A1   Jan. 18, 2024

(30) Foreign Application Priority Data

Jun. 29, 2022   (JP) .................. 2022-104882

(51) Int. Cl.
*F02N 11/08*   (2006.01)
*F02N 15/00*   (2006.01)
*F02N 15/02*   (2006.01)
*F16D 41/00*   (2006.01)

(52) U.S. Cl.
CPC ........ *F02N 11/0851* (2013.01); *F02N 15/006* (2013.01); *F02N 15/022* (2013.01); *F16D 41/00* (2013.01)

(58) Field of Classification Search
CPC ............. F02N 11/0851; F02N 11/0859; F02N 15/006; F02N 15/022; F02N 15/02; F16D 41/00; F16D 41/04
See application file for complete search history.

(56) References Cited

U.S. PATENT DOCUMENTS

| | | | | |
|---|---|---|---|---|
| 2004/0255890 | A1* | 12/2004 | Tsutsumi | F02N 15/006 123/179.24 |
| 2011/0011364 | A1* | 1/2011 | Koyanagi | F16F 15/322 123/192.2 |
| 2020/0309061 | A1* | 10/2020 | Hatae | F02N 15/022 |

FOREIGN PATENT DOCUMENTS

JP   2020-159325 A   10/2020

* cited by examiner

*Primary Examiner* — Syed O Hasan
(74) *Attorney, Agent, or Firm* — Rabin & Berdo, P.C.

(57) ABSTRACT

An internal combustion engine includes: a crankshaft; a starter motor including a motor shaft; a starter gear fixed to the crankshaft, for receiving a driving force from the motor shaft; a one-way clutch that is interposed between the crankshaft and the starter gear, the one-way clutch being configured to transmit a driving force from the starter gear to the crankshaft, and to block a driving force from the crankshaft to the starter gear; and a balancer including a balancer drive gear fixed to the crankshaft and a balancer driven gear that is driven by the balancer drive gear to thereby rotate. The one-way clutch and the balancer drive gear are formed integrally.

5 Claims, 3 Drawing Sheets

L34=L30

INTERNAL COMBUSTION ENGINE AND STRADDLED VEHICLE

CROSS-REFERENCE TO RELATED APPLICATIONS

This application claims the benefit of priority to Japanese Patent Application No. 2022-104882 filed on Jun. 29, 2022, the entire contents of which are hereby incorporated herein by reference.

BACKGROUND OF THE INVENTION

Field of the Invention

The present invention relates to an internal combustion engine and a straddled vehicle having the same.

Description of the Related Art

As disclosed in JP 2020-159325A, for example, an internal combustion engine having a starter motor and a balancer has been known in the art. With an internal combustion engine having a starter motor, the driving force of the starter motor is transmitted to the crankshaft during the start, and the driving force from the crankshaft to the starter motor must be shut off after the start. In view of this, a one-way clutch has conventionally been provided between the starter motor and the crankshaft. The balancer includes a balancer drive gear provided on the crankshaft and a balancer driven gear that meshes with the balancer drive gear.

With the internal combustion engine disclosed in JP 2020-159325A, the one-way clutch and the balancer drive gear are fixed to the crankshaft. The crankshaft extends in the left-right direction, and the one-way clutch is arranged rightward of the balancer drive gear. That is, the one-way clutch and the balancer drive gear are separate parts of each other and are arranged side-by-side in the axial direction of the crankshaft.

With the internal combustion engine described above, since the one-way clutch and the balancer drive gear are arranged side-by-side in the axial direction of the crankshaft, the dimension of the internal combustion engine in the axial direction of the crankshaft tends to become large. Since the one-way clutch and the balancer drive gear are separate parts, the number of parts increases and the weight tends to increase.

SUMMARY OF THE INVENTION

The present invention has been made in view of the above, and an object thereof is to provide an internal combustion engine including a starter motor and a balancer, wherein it is possible to reduce the dimension of the internal combustion engine in the axial direction of the crankshaft and it is possible to reduce the weight of the internal combustion engine, and a straddled vehicle having the same.

An internal combustion engine disclosed herein includes: a crankshaft; a starter motor including a motor shaft; a starter gear fixed to the crankshaft and receiving driving force of the motor shaft; a one-way clutch; and a balancer. The one-way clutch is interposed between the crankshaft and the starter gear, transmits driving force from the starter gear to the crankshaft, and blocks driving force from the crankshaft to the starter gear. The balancer includes a balancer drive gear fixed to the crankshaft and a balancer driven gear that rotates by receiving driving force of the balancer drive gear. The one-way clutch and the balancer drive gear are formed integral together.

With the internal combustion engine described above, since the one-way clutch and the balancer drive gear are formed integral together, it is possible to reduce the dimension of the internal combustion engine in the axial direction of the crankshaft as compared with a case where the one-way clutch and the balancer drive gear are separate parts of each other and are arranged side-by-side in the axial direction of the crankshaft. It is also possible to reduce the weight of the internal combustion engine.

The one-way clutch may include a cylindrical inner race, a cylindrical outer race arranged radially outward of the inner race, and a clutch element arranged between the inner race and the outer race. The outer race may be fixed to the crankshaft. The inner race may be formed integral with the starter gear. The balancer drive gear may include gear teeth formed integral with the outer race.

The gear teeth may be formed on a radially outer portion of the outer race.

The internal combustion engine may include: a main shaft arranged parallel to the crankshaft; a clutch that is arranged coaxial with the main shaft, and disconnectably connects between the crankshaft and the main shaft; and a starter idle gear that meshes with the starter gear and transmits driving force of the motor shaft to the starter gear. The starter idle gear may be arranged coaxial with the main shaft.

Thus, since the starter idle gear is interposed between the motor shaft and the starter gear, the starter motor can be arranged at a position far from the crankshaft. Since the starter idle gear is arranged coaxial with the main shaft, it is possible to avoid the increase in size of the internal combustion engine as viewed from the axial direction of the main shaft. Since the starter idle gear is supported on the main shaft, there is no need for a dedicated shaft for supporting the starter idle gear. Thus, it is possible to reduce the number of parts, and it is possible to reduce the weight of the internal combustion engine.

The clutch may include a clutch housing linked to the crankshaft, and a clutch boss that is rotatable with respect to the clutch housing. The starter idle gear may be fixed to the clutch housing. The internal combustion engine may include a torque limiter interposed between the motor shaft and the starter idle gear.

A straddled vehicle disclosed herein includes the internal combustion engine described above. The internal combustion engine may include a crankcase that supports the crankshaft, and a cylinder body that extends rearward in a vehicle front-rear direction and upward in a vehicle up-down direction from the crankcase. The starter motor may be arranged rearward of the cylinder body.

With the straddled vehicle described above, since the starter motor is arranged rearward of the cylinder body, it is possible to promote the mass centralization of the straddled vehicle.

An axial center of the main shaft may be located rearward in the vehicle front-rear direction and upward in the vehicle up-down direction relative to an axial center of the crankshaft. The axial center of the motor shaft may be located rearward in the vehicle front-rear direction and upward in the vehicle up-down direction relative to the axial center of the main shaft.

Thus, the starter motor is arranged at a position relatively far from the crankshaft. However, since the starter idle gear is interposed between the motor shaft and the starter gear, it is possible to desirably start the internal combustion engine by means of the starter motor.

According to the present invention, it is possible to provide an internal combustion engine including a starter motor and a balancer, wherein it is possible to reduce the dimension of the crankshaft in the axial direction and it is possible to reduce the weight of the internal combustion engine, and a straddled vehicle having the same.

DETAILED DESCRIPTION OF THE PREFERRED EMBODIMENTS

Figure 1:
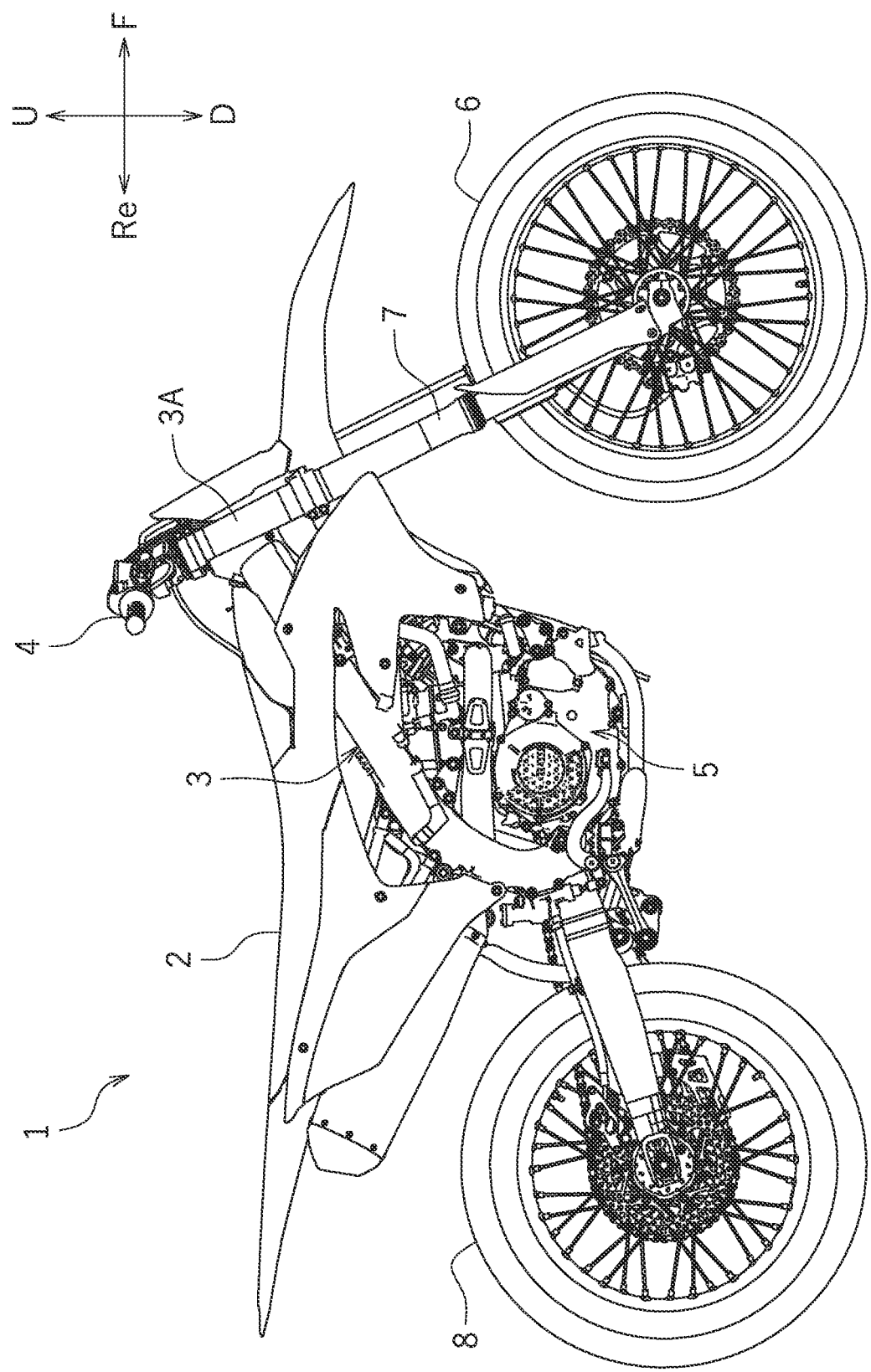
FIG. 1 is a right side view of a motorcycle according to an embodiment.

An internal combustion engine and a straddled vehicle according to one embodiment will now be described with reference to the drawings. FIG. 1 is a right side view of a motorcycle 1, which is an example of a straddled vehicle.

The terms front, rear, left, right, up and down, as used in the description below, refer to these directions as viewed from a virtual rider seated on a seat 2 while the motorcycle 1 is standing upright on a horizontal surface with no rider and no load thereon, unless specified otherwise. The designations F, Re, L, R, U and D, as used in the figures, refer to front, rear, left, right, up and down, respectively.

The motorcycle 1 includes a vehicle body frame 3 with a head pipe 3A, a seat 2 on which the rider is seated, an internal combustion engine (hereinafter referred to as "engine") 5, a front wheel 6 and a rear wheel 8. A steering shaft (not shown) is supported on the head pipe 3A so that the steering shaft can rotate left and right. A handlebar 4 is fixed to an upper portion of the steering shaft. The front fork 7 is fixed to a lower portion of the steering shaft. The front wheel 6 is supported on the front fork 7.

Figure 2:
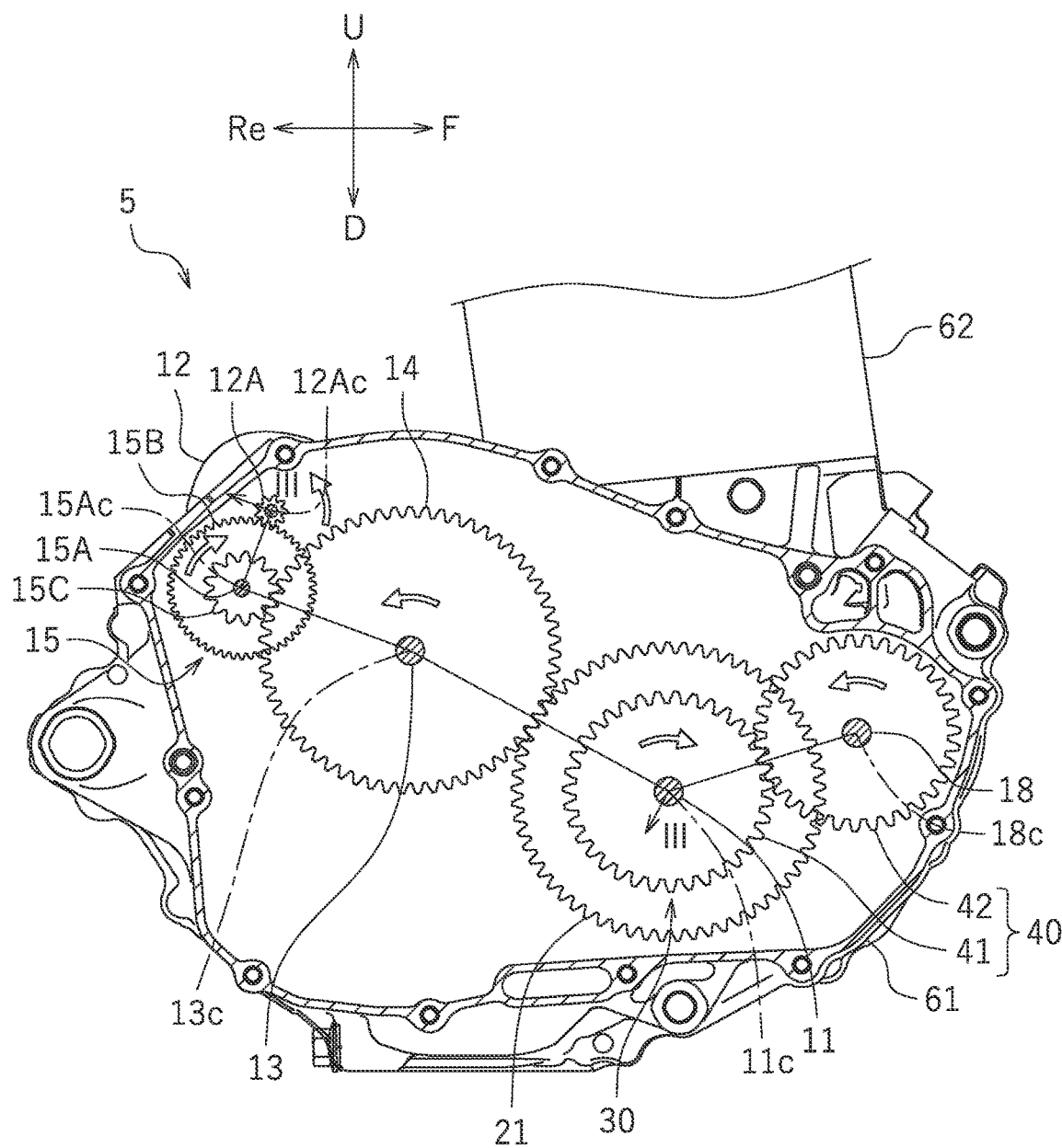
FIG. 2 is a vertical cross-sectional view showing a portion of an internal combustion engine.

FIG. 2 is a vertical cross-sectional view showing a portion of the engine 5. The engine 5 includes a crankcase 61 and a cylinder body 62 extending rearward and upward from the crankcase 61. The engine 5 includes a crankshaft 11 supported on the crankcase 61 and a piston (not show) linked to the crankshaft 11 via a connecting rod (not shown). The piston is arranged inside the cylinder body 62.

Figure 3:
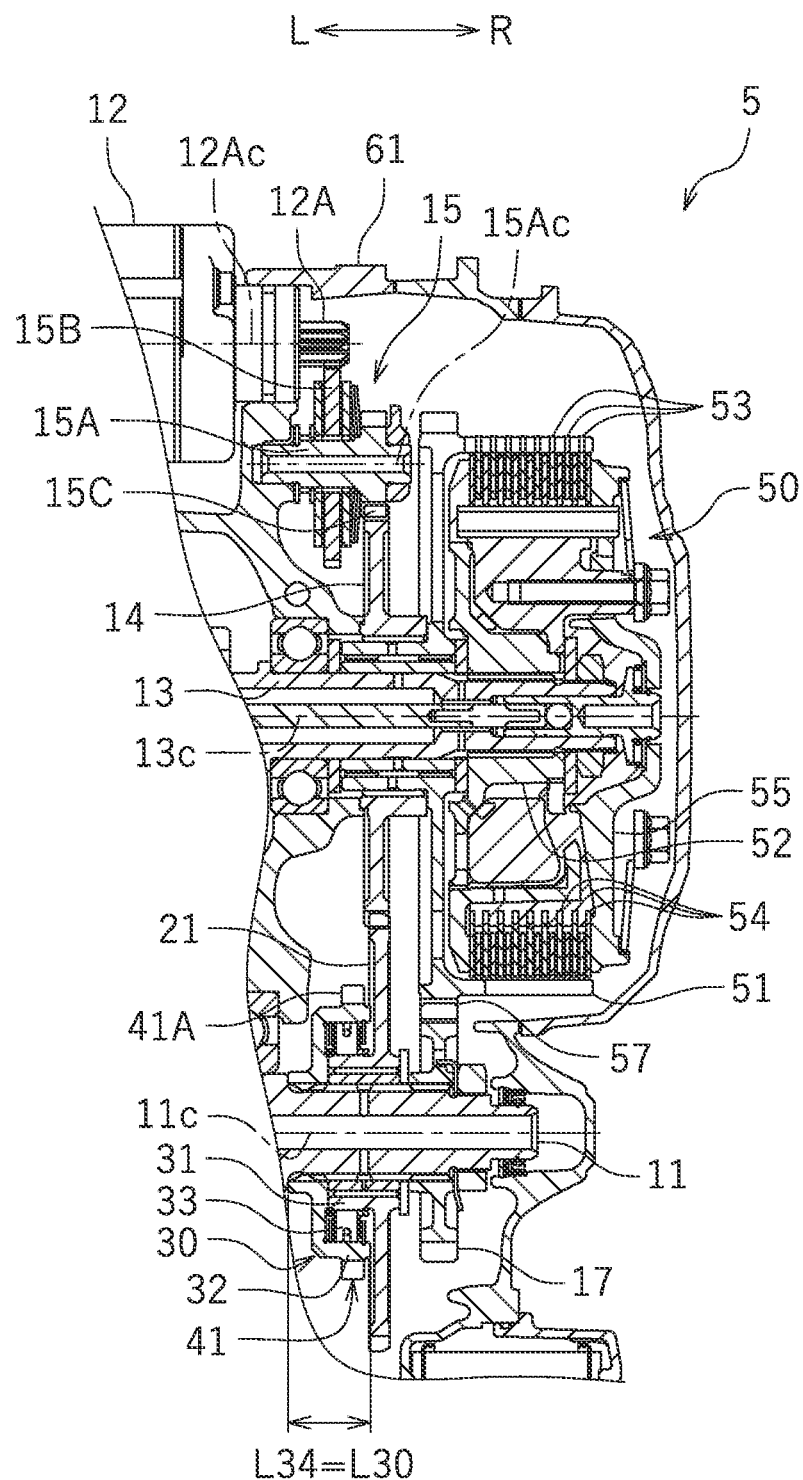
FIG. 3 is a cross-sectional view taken along line III-III of FIG. 2.

FIG. 3 is a cross-sectional view taken along line of FIG. 2. A crankshaft 11 extends in the left-right direction. The main shaft 13 is arranged parallel to the crankshaft 11. A clutch 50 is attached to the main shaft 13. The clutch 50 is arranged coaxial with the main shaft 13. The clutch 50 disconnectably connects between the crankshaft 11 and the main shaft 13. The clutch 50 includes a clutch housing 51, a clutch boss 52 rotatable with respect to the clutch housing 51, a plurality of plates 53 supported on the clutch housing 51, a plurality of plates 54 supported on the clutch boss 52, and a pressure plate 55 that presses together the plates 53 and the plates 54. The plates 53 and the plates 54 are arranged alternating with each other. A gear 17 is fixed to crankshaft 11. A gear 57 that meshes with the gear 17 is formed in the clutch housing 51. The clutch housing 51 is linked to the crankshaft 11 via the gear 57 and the gear 17. The clutch housing 51 rotates together with the crankshaft 11.

As shown in FIG. 2, the engine 5 includes a starter motor 12, a torque limiter 15, a starter idle gear 14, a starter gear 21 and a one-way clutch 30. The engine 5 also includes a balancer 40 having a balancer drive gear 41 and a balancer driven gear 42.

The starter motor 12 is arranged rearward of the cylinder body 62. The starter motor 12 is arranged rearward and upward relative to the axial center 11c of the crankshaft 11. The starter motor 12 includes a motor shaft 12A. The motor shaft 12A extends in the left-right direction.

The torque limiter 15 is connected to the motor shaft 12A. The torque limiter 15 is interposed between the motor shaft 12A and the starter idle gear 14. As shown in FIG. 3, the torque limiter 15 includes a shaft 15A extending in the left-right direction, a gear 15B slidably supported on the shaft 15A, and a gear 15C provided integral with the shaft 15A. When the transmitted torque between the shaft 15A and the gear 15B is less than or equal to a threshold value, the shaft 15A and the gear 15B rotate together. When the transmitted torque between the shaft 15A and the gear 15B is greater than the threshold value, the gear 15B rotates with respect to the shaft 15A. In other words, the gear 15B rotates idle on the shaft 15A. This prevents an excessive load on the starter motor 12.

The starter idle gear 14 is a gear that transmits the driving force of the starter motor 12 to the starter gear 21. The starter idle gear 14 meshes with the starter gear 21. The starter idle gear 14 is rotatably supported on the main shaft 13. Here, the starter idle gear 14 is fixed to the clutch housing 51. The starter idle gear 14 is supported on the main shaft 13 via the clutch housing 51. The starter idle gear 14 is arranged coaxial with the main shaft 13. The starter idle gear 14 meshes with the gear 15C of the torque limiter 15. The starter idle gear 14 rotates together with the gear 15C of the torque limiter 15.

The starter gear 21 is a gear that transmits the driving force of the starter motor 12 to the crankshaft 11. The starter gear 21 is fixed to the crankshaft 11. The starter gear 21 is designed to receive the driving force of the motor shaft 12A via the torque limiter 15 and the starter idle gear 14.

The one-way clutch 30 is interposed between the crankshaft 11 and the starter gear 21. The one-way clutch 30 transmits the driving force from the starter gear 21 to the crankshaft 11, and blocks the driving force from the crankshaft 11 to the starter gear 21.

The balancer drive gear 41 of the balancer 40 is fixed to the crankshaft 11. The balancer drive gear 41 rotates together with the crankshaft 11. As shown in FIG. 2, the balancer driven gear 42 is supported on a balancer shaft 18. The balancer driven gear 42 meshes with the balancer drive gear 41. The balancer driven gear 42 rotates by receiving the driving force of the balancer drive gear 41. The balancer driven gear 42 rotates together with the balancer drive gear 41. Note that arrows in FIG. 2 indicate directions of rotation.

In the present embodiment, the one-way clutch 30 and the balancer drive gear 41 are formed integral together. As shown in FIG. 3, the one-way clutch 30 includes a cylindrical inner race 31, a cylindrical outer race 32 arranged radially outward of the inner race 31, and a clutch element 33 arranged between the inner race 31 and the outer race 32. The outer race 32 is fixed to the crankshaft 11. The inner race 31 is formed integral with the starter gear 21. The inner race 31 and the starter gear 21 are a single part. Note however that the inner race 31 and the starter gear 21 may be separate parts. The balancer drive gear 41 is integrated with the outer race 32. The balancer drive gear 41 and the outer race 32 are a single part. The balancer drive gear 41 includes a plurality of gear teeth 41A formed integral with the outer race 32. The gear teeth 41A are formed on the radially outer portion of the outer race 32.

As shown in FIG. 2, the axial center 15Ac of the shaft 15A of the torque limiter 15 is located rearward and downward relative to the axial center 12Ac of the motor shaft 12A. The axial center 13c of the main shaft 13 is located forward and downward relative to the axial center 15Ac of the shaft 15A. The axial center 11c of the crankshaft 11 is located forward and downward relative to the axial center 13c of the main shaft 13. The axial center 18c of the balancer shaft 18 is located forward and upward relative to the axial center 11c of the crankshaft 11. However, the shaft arrangement described above is only an example, and there is no particular limitation thereto.

The engine 5 and the motorcycle 1 according to the present embodiment are configured as described above. Next, various advantageous effects to be realized by the present embodiment will be described.

With the engine 5 according to the present embodiment, the one-way clutch 30 and the balancer drive gear 41 are formed integral together as shown in FIG. 3. The balancer drive gear 41 includes gear teeth 41A formed integral with the outer race 32 of the one-way clutch 30. The gear teeth 41A are formed on the radially outer portion of the outer race 32. According to the present embodiment, the total dimension L34 of the one-way clutch 30 and the balancer drive gear 41 in the axial direction is equal to the dimension L30 of the one-way clutch 30 alone in the axial direction. The total dimension L34 of the one-way clutch 30 and the balancer drive gear 41 in the axial direction is smaller than when the one-way clutch 30 and the balancer drive gear 41 are separate parts of each other and are arranged side-by-side in the axial direction of the crankshaft 11. Therefore, according to the present embodiment, it is possible to reduce the dimension of the engine 5 in the axial direction of the crankshaft 11. In the present embodiment, the crankshaft 11 extends in the left-right direction, and it is possible to reduce the dimension of the engine 5 in the left-right direction. Moreover, since the number of parts is reduced, the weight of the engine 5 can be reduced.

According to the present embodiment, the engine 5 includes the starter idle gear 14 arranged coaxial with the main shaft 13. Since the starter idle gear 14 is interposed between the motor shaft 12A and the starter gear 21, the starter motor 12 can be arranged at a position far from the crankshaft 11. Since there are less restrictions on the location of the starter motor 12, it is possible to increase the degree of freedom in the installation of the starter motor 12. Since the starter idle gear 14 is arranged coaxial with the main shaft 13, it is possible to avoid the increase in size of the engine 5 as viewed from the axial direction of the main shaft 13. Since the starter idle gear 14 is supported on the main shaft 13, there is no need for a dedicated shaft for supporting the starter idle gear 14. Thus, it is possible to reduce the number of parts. It is possible to reduce the weight of the engine 5.

According to the present embodiment, as shown in FIG. 2, the starter motor 12 is arranged rearward of the cylinder body 62, and it is possible to promote the mass centralization of the motorcycle 1.

According to the present embodiment, the axial center 13c of the main shaft 13 is located rearward and upward relative to the axial center 11c of the crankshaft 11, and the axial center 12Ac of the motor shaft 12A is located rearward and upward relative to the axial center 13c of the main shaft 13. Although the starter motor 12 is arranged at a position relatively far from the crankshaft 11, since the starter idle gear 14 is interposed between the motor shaft 12A and the starter gear 21, it is possible to desirably start the engine 5 by means of the starter motor 12.

While one embodiment has been described above, the above embodiment is merely an example, and various other embodiments are possible.

While the engine 5 includes the starter idle gear 14 in the embodiment described above, the starter idle gear 14 may be absent when the distance between the motor shaft 12A and the starter gear 21 is short. While the starter idle gear 14 is supported on the main shaft 13 that supports the clutch 50, the starter idle gear 14 may be supported on a shaft other than the main shaft 13.

The cylinder body 62 does not need to extend rearward and upward from the crankcase 61. For example, the cylinder body 62 may extend forward and upward from the crankcase 61.

A straddled vehicle refers to a vehicle that is straddled by the rider. The straddled vehicle is not limited to the motorcycle 1. The straddled vehicle may be an auto tricycle, an ATV (All Terrain Vehicle), or a snowmobile, for example.

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

What is claimed is:

1. An internal combustion engine comprising: a crankshaft; a starter motor including a motor shaft; a starter gear fixed to the crankshaft, the starter gear receiving a driving force from the motor shaft; a one-way clutch that is interposed between the crankshaft and the starter gear, the one-way clutch being configured to transmit a driving force from the starter gear to the crankshaft, and to block a driving force from the crankshaft to the starter gear; and a balancer, including a balancer drive gear fixed to the crankshaft, a balancer driven gear that is driven by the balancer drive gear to thereby rotate, wherein the one-way clutch and the balancer drive gear are formed integrally, wherein: the one-way clutch includes a cylindrical inner race, a cylindrical outer race arranged radially outward of the inner race, and a clutch element arranged between the inner race and the outer race; the outer race is fixed to the crankshaft; the inner race is formed integrally with the starter gear; and the balancer drive gear includes gear teeth formed integrally with the outer race, and wherein the gear teeth are formed on a radially outer portion of the outer race.

2. The internal combustion engine according to claim 1, further comprising:

a main shaft arranged in parallel to the crankshaft;

a clutch that is coaxial with the main shaft, and that disconnectably connects the crankshaft and the main shaft; and a starter idle gear that meshes with the starter gear and transmits the driving force from the motor shaft to the starter gear, wherein the starter idle gear is coaxial with the main shaft.

3. The internal combustion engine according to claim 2, wherein:

the clutch includes a clutch housing linked to the crankshaft, and a clutch boss that is rotatable with respect to the clutch housing;

the starter idle gear is fixed to the clutch housing; and the internal combustion engine further includes a torque limiter interposed between the motor shaft and the starter idle gear.

4. A straddled vehicle comprising the internal combustion engine according to claim 1, wherein:

the internal combustion engine further includes a crankcase that supports the crankshaft, and a cylinder body that extends rearward in a front-rear direction of the straddled vehicle and upward in an up-down direction of the straddled vehicle from the crankcase; and the starter motor is arranged rearward of the cylinder body.

5. A straddled vehicle comprising the internal combustion engine according to claim 2, wherein:

the internal combustion engine further includes a crankcase that supports the crankshaft, and a cylinder body that extends rearward in a front-rear direction of the straddled vehicle and upward in an up-down direction of the straddled vehicle from the crankcase;

the starter motor is arranged rearward of the cylinder body;

an axial center of the main shaft is located further rearward in the front-rear direction and further upward in the up-down direction than an axial center of the crankshaft; and an axial center of the motor shaft is located further rearward in the front-rear direction and further upward in the up-down direction than the axial center of the main shaft.

* * * * *